United States Patent Office 3,381,296
Patented Apr. 30, 1968

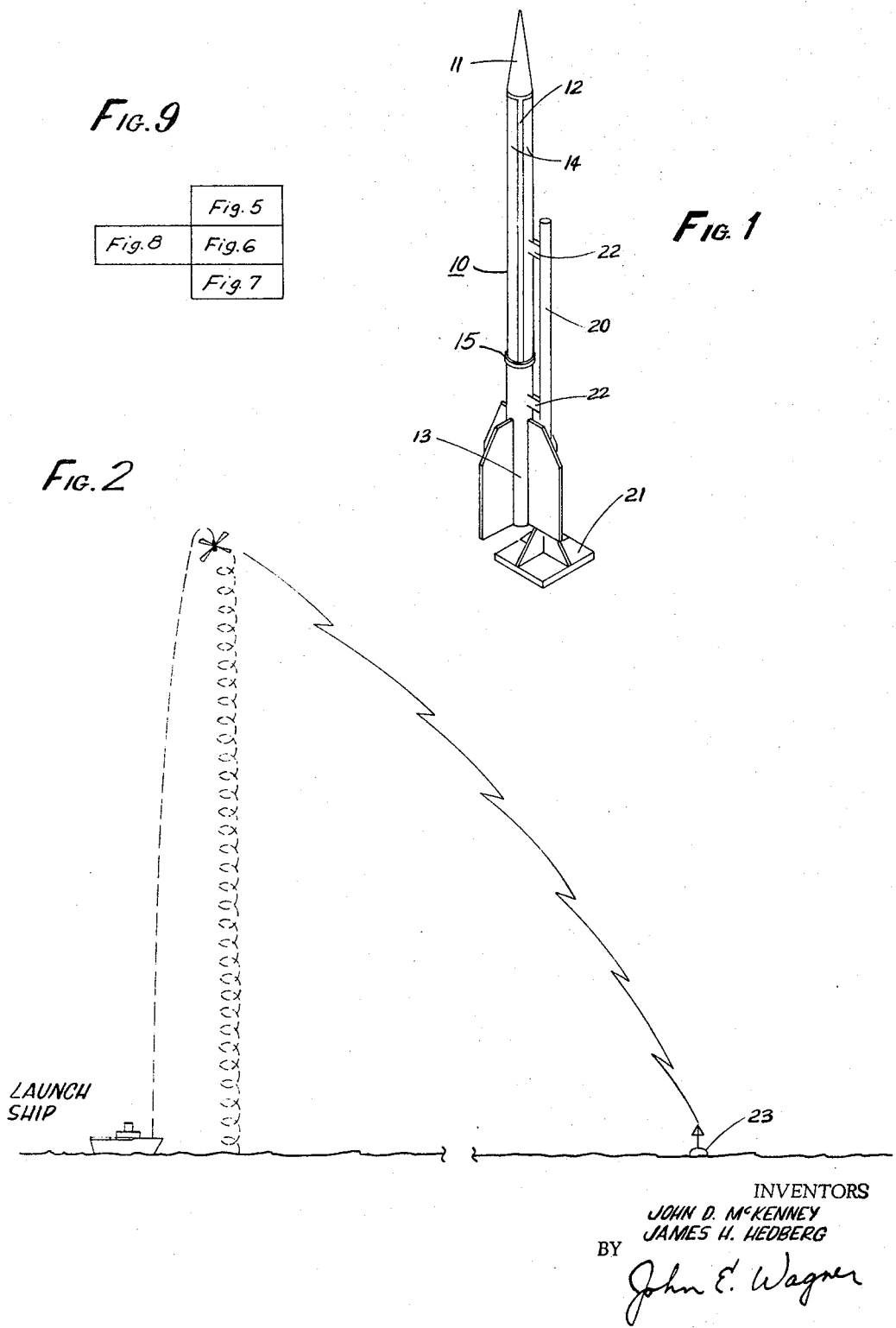

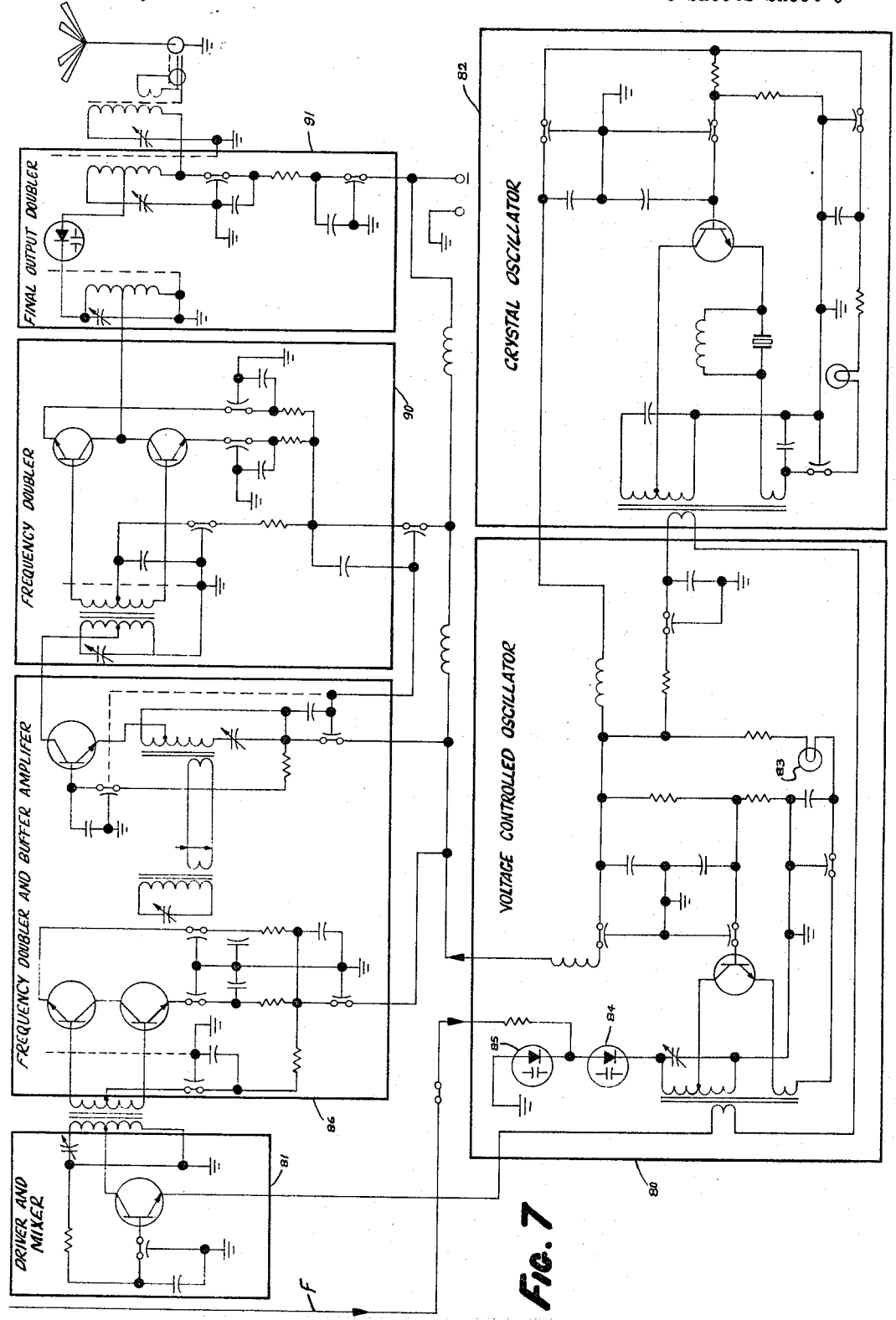

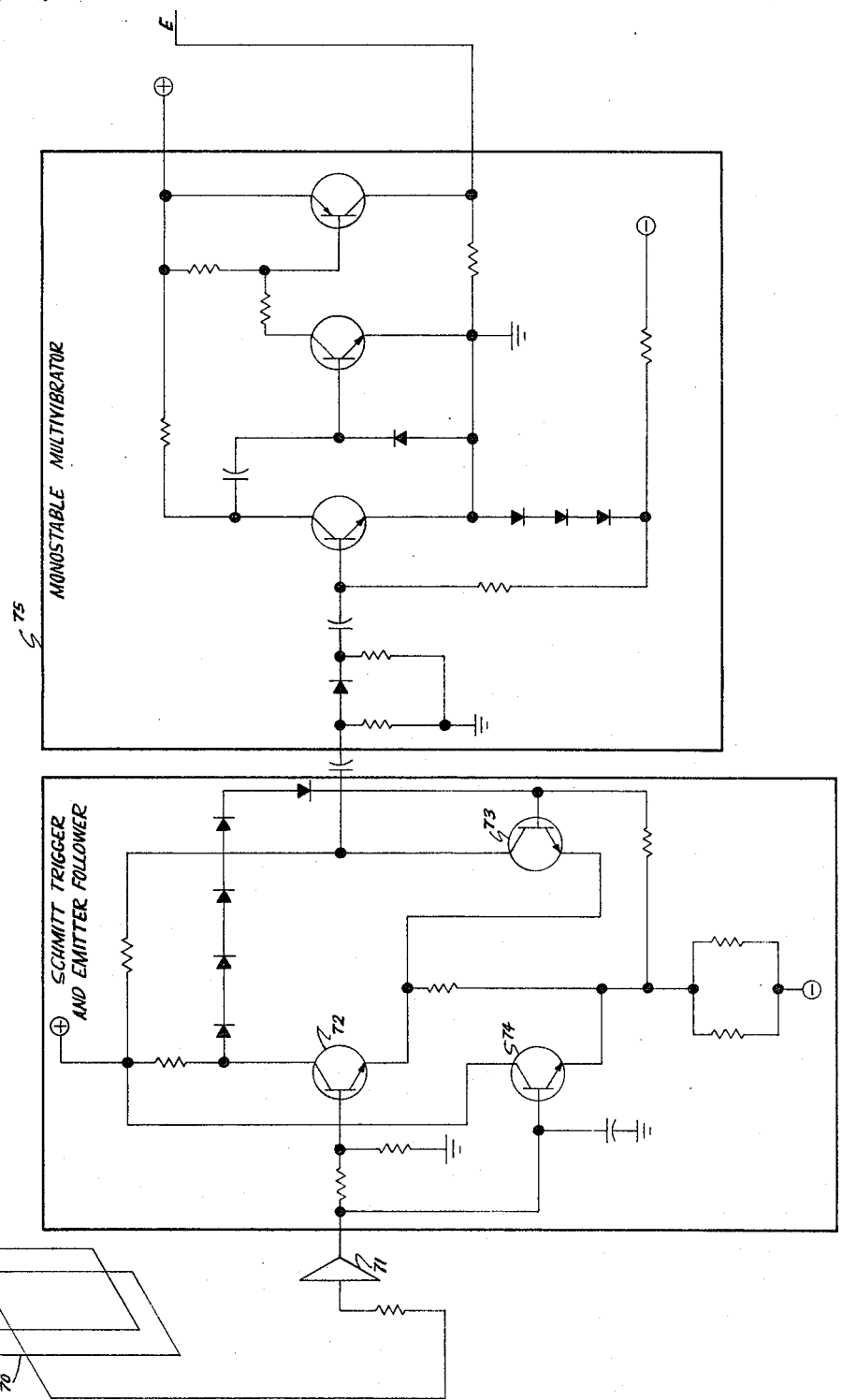

3,381,296
RADIO APPARATUS AND METHOD FOR DETERMINING THE BEARING AND RANGE OF A REMOTE RADIO BEACON
John D. McKenney, Pasadena, and James H. Hedberg, Garden Grove, Calif., assignors, by mesne assignments, to Aerojet-General Corporation, El Monte, Calif., a corporation of Ohio
Filed July 11, 1966, Ser. No. 565,029
5 Claims. (Cl. 343—112)

ABSTRACT OF THE DISCLOSURE

This disclosure describes a system, including a rocket-launched auto-gyrating radio repeater, which is capable of detecting radio signals from remote transmitter or beacon and retransmitting the signals to the launch station. The repeater includes a directional receiving antenna, an azimuth reference loop affixed to the auto-gyrating body, and an omnidirectional transmitting antenna. The repeater transmitter includes provisions for combining the incoming signal from the remote beacon with the azimuth loop signal. The receiving station includes means for detecting the phase difference between a null in the retransmitted signal and the azmiuth reference as an indication of bearing. The receiving station also includes means for determining the range of the beacon from the repeater as a function of the time interval between loss of retransmitted signal from the remote beacon (as it passes beyond the radio horizon) and the time of repeater transmission cessation (splash down).

---

This invention relates to radio communication systems and more particularly to such systems having direction finding capability.

There has long existed a need for a simple portable radio communication system operative both as a communications link, and also capable of determining both the range and azimuth of a remote transmitter. This need has particularly been felt in the case of locating aircraft or rocket payloads downed in ocean waters. Another need is to assist in the location of stranded individuals or military units in remote areas.

Heretofore the position finding capabilities of normal search vehicles, such as surface ships, is limited by surface radar range and sensitivity and in the case of radio direction finding to the bearing of a remote transmitter or beacon.

In accordance with this invention, a single search vessel is afforded with both bearing and range determination capability of beacons, or remote transmitters having only line-of-sight transmission range capability. For example, using the system of this invention, a single ship can have a radio search capability of 125,000 square miles in the 50–500 megacycle frequency range without aircraft support. The system affords a line-of-sight bearing accuracy and ranging capability as well at ranges up to 200 miles.

It is one object of this invention to provide a simple effective radio position locating system.

Another object of this invention is to provide a communications repeater link between a search vehicle and a remote low power transmitter beyond the normal radio receiving range.

Still another object of this invention is to enable accurate position fixing of a remote transmitter by a single receiving station.

One further object of this invention is to devise a method of rapidly erecting a repeater station, thereby expanding the radio range of a radio receiving station without restraining the launch vehicle from departure.

These and other objects are all accomplished by this invention which, in one embodiment called "Searcher," comprises a rocket including payload containing an azimuth reference, receiver, transmitter and rotor retardation device and a motor section including a small boost rocket for firing the payload vertically to approximately 45,000 feet. The descent-after-burnout of the boost rocket is under the control of the retardation device, a number of auto gyrating rotor blades affixed to the body. The electronic package of the payload is active during descent to receive radio transmissions from a remote transmitter, retransmit the received signals to the launch vehicle receiver and transmit bearing information derived from the azimuth reference as well.

One feature of the invention involves the combination of a rocket-launched, rotor-retarded radio repeater for a temporary radio communications link.

Another feature of this invention includes the above combination with an azimuth reference, whereby the orientation of the repeater with respect to a reference direction is determined.

Still another feature of the invention relates to the use of a directional receiving antenna in combination with the above to indicate the bearing of the received signal source.

One other feature of this invention is the above combination with a timing means for registering the range to the remote transmitter.

Still another feature resides in the combination of an aerodynamic stabilization and descent system which cooperates with a directional antenna array to provide continuous search or sweep operation.

These and other features of this invention may be more clearly understood from the following detailed specification and by reference to the drawing in which:

FIG. 1 is an isometric view of the search vehicle of this assembly mounted for launching;

FIG. 2 is a simplified showing of the path of travel of the Searcher vehicle in operation;

FIGS. 5, 6, 7 and 8 constitute an electrical schematic diagram of the electronics package of the Searcher vehicle; and, FIG. 9 is a layout illustrating the correct arrangement of FIGS. 5, 6, 7 and 8.

Figure 3:
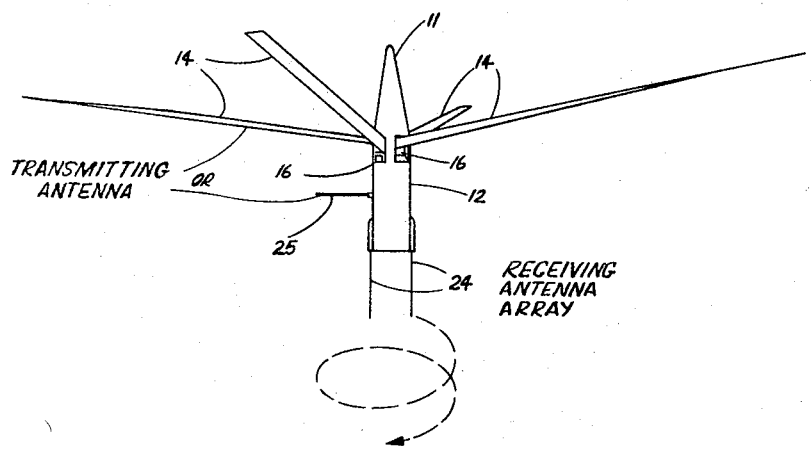
FIG. 3 is an elevational view of the Searcher vehicle in its fully deployed descent configuration.

Now referring to FIGS. 1 and 3, the basic vehicle is shown in FIG. 1 comprising a fin-stabilized unguided missile 10, including a nose cone 11, a body portion 12, and a motor section 13. Overlying the body 12, are a plurality, for example, four rotor blades 14, hinged at their forward end to the vehicle body 12, and secured against the body 12, during launch and powered flight by a retainer ring 15. The vehicle in a typical embodiment is approximately 110 inches in length, 5 inches in body diameter and weighs slightly less than 100 lbs. at launch. It is powered by a solid propellant rocket motor in the finned-after section 13, of the vehicle.

A suitable launch platform for the vehicle is a simple vertical slotted tube 20, on a base plate 21, mounted, for example, in the deck of a surface vessel. T-shaped runners 22, engage the slotted tube to provide an effective zero length track launch system.

A typical launch sequence is illustrated in FIG. 2 in conjunction with FIGS. 1 and 3. The vehicle is of dimensions and weight that one man may erect and fire the rocket when the need to pinpoint a remote radio transmitter or beacon 23 occurs. Typically, the vehicle is carried on a surface ship which might be called upon to search for downed aircraft or personnel or in payload recovery operations in space research.

Upon receipt of word to commence a search operation for a distant line-of-sight range radio transmitter or beacon, the electronics package described below and contained within the body portion 12 is activated, and the vehicle mounted in the launcher and fired vertically in an unguided trajectory. Using a rocket motor having a thrust of 4,000 lbs. for 2 sec., a vehicle of the characteristics described is lifted to 3,800 feet under powered flight and coasts to approximately 45,000 feet altitude with insignificant dispersion from the point of launch. If desired the exact position during descent may be tracked by radar and plotted.

By operation of an altitude deceleration sensor or nose stagnation pressure detector contained in the vehicle, the retainer 15 is released permitting the payload to move forward slightly, thereby releasing the spring-loaded rotor blades 14. The vehicle then becomes aerodynamically unstable and tumbles separating the payload, sections 11 and 12, from the booster motor 13. The payload stabilizes in the configuration shown in FIG. 3 with rotor blades 14, fully extended to 100 inch diameter and descends at an initial descent rate of 20 f.p.s. and a spin rate of approximately 10 r.p.s. As the payload descends, the increasing air density reduces the speed of rotation and descent to approximately 5 r.p.s. and 8 f.p.s. respectively. Normal descent time is 45 minutes during which radio sources within the enlarged radio horizon may be monitored and located in range and bearing.

The external features of the Searcher vehicle include the nose cone 11, the rotor blades 14, with their spring-loaded hinges 16, and the body portion 12, mounting two quarter wave length receiving antennae 24, and a single transmitting antenna 25. In certain applications, depending upon the operating frequencies, one or more of the rotor blades 14 may be properly insulated and used as the transmitting antenna.

Figure 4:
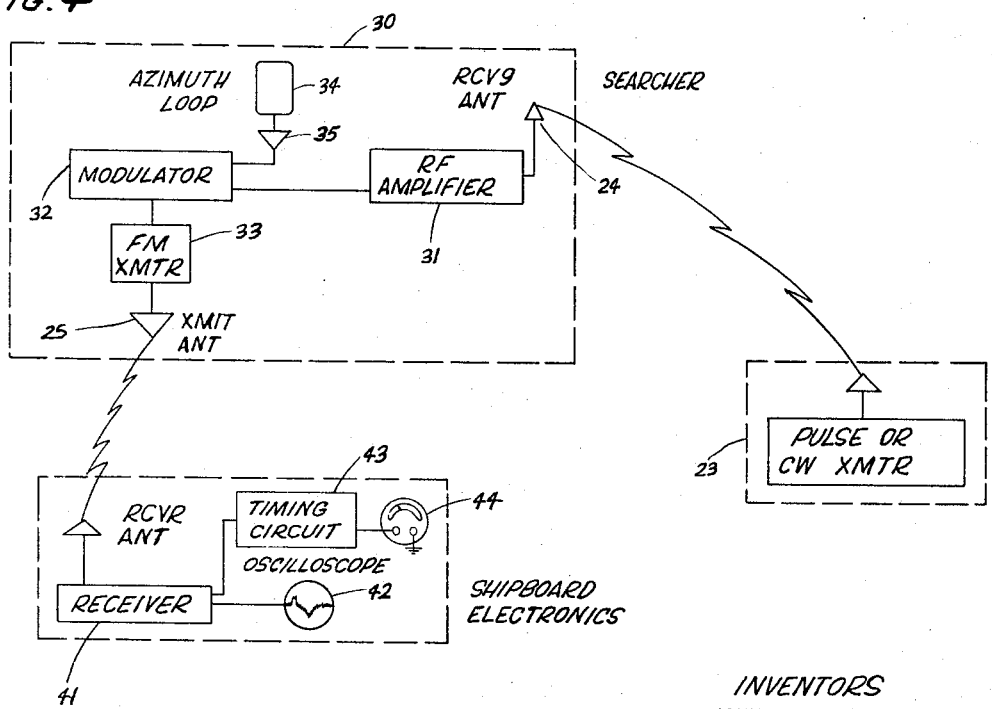
FIG. 4 is a block diagram of the electronic system of this invention.

Contained within the vehicle is the electronic package 30, of FIG. 4 which comprises a power supply, unshown in the drawing, an RF amplifier 31, connected to the receiving antennae and applied to a modulator 32, which frequency modulates a transmitter 33, driving the transmitting antenna 25. The transmitter is also modulated by the input from an azimuth reference source including a loop antenna 34, and azimuth reference amplifier 35. The azimuth reference coil 34 is fixed with respect to the body and the electronic package. High gain circuitry may be used with spurious signal produced due to relative motion of the loop 34 and the circuitry.

The transmitted signal from the Searcher vehicle is a composite of the received signal from the remote transmitter or beacon 23, and the azimuth reference loop 34, whereby the signal or message from the beacon 23, is relayed to the ground or ship station and its bearing is also indicated by superimposed modulation. As an example, where either CW or pulse transmissions from the remote transmitter or beacon 23 are used, the azimuth reference may be a superimposed distinguishable pulse at the instant, in each revolution, when the azimuth reference loop passes magnetic north. At the same time, the receiving antennae 24 provides a cardioid pattern with the null fixed with respect to the Searcher body. The time relationship between the azimuth reference signal (magnetic north) and the relayed signal null indicates the beacon bearing.

The ground or ship station requires a receiving antenna 40, receiver 41, with compatible detectors and some type of data display 42. For simplicity, the display is represented as an oscilloscope with an information trace (modulated wave with null) and a superimposed azimuth pulse. With the sweep rate of the oscilloscope set at the rotation rate of the vehicle, the azimuth of the beacon may be read directly. The shipboard electronics also includes timing means to measure the time between the loss of the repeated signal when the Searcher vehicle descends below the radio horizon of the remote beacon and loss of all signal, i.e. splash down. This timing function can either be accomplished manually or preferably by a timing circuit 43, triggered by a loss of repeated signal over one or two complete revolutions of the Searcher vehicle and stopped by the loss of all signal. The time interval is registered as range to the beacon on a meter 44.

The details of operation of the system may be further explained by reference to FIGS. 5, 6, 7 and 8 illustrating a suitable electronic circuit for the Searcher vehicle. The receiver shown in FIG. 5 comprises an RF amplifier 50, fed by the dipole array 24A and 24B, and transformer coupled to the first mixer 51. Typically the RF amplifier 50, and first mixer 51, are relatively broad band (15 mc.) spanning the required beacon frequency band such as 230 to 245 mc. Following the first mixer 51, is a band pass filter 52, centered at the first intermediate frequency and having a bandwidth of 0.5 mc. The received converted signal is next amplified in the 3-stage first IF amplifier 53, having gain controlled via lead A by an AGC circuit including an AGC detector 54, and an AGC amplifier 55, both appearing in FIG. 6. The AGC circuit preferably has a delay time much longer than one second to insure that azimuth information developed by the rotating cardioid antenna field is not degraded.

Following the first IF amplifier is a second mixer 56 of conventional design fed by the second local oscillator 60, a crystal controlled Pierce oscillator tuned to the second intermediate frequency 4.5 mc. The output of the second mixer 56 is conducted via lead B to the second IF amplifier 61, appearing in FIG. 6 and having three stages producing a gain in the order of 45 db and a bandwidth of 100 kc. as required to pass adequately defined pulses. Following the second IF amplifier is the signal detector, a diode 62, coupled via lead D between the output stage of amplifier 61, and the transmitter modulator 63.

The second IF amplifier 61, is also coupled to the AGC detector 54, which again is a simple diode detector designed to extract carrier amplitude information from the received signal for control purposes. The output of the AGC detector diode 57 is filtered and presented as a varying unidirectional voltage to the AGC amplifier 55. This unidirectional voltage, amplified is then applied over lead A to control the gain of the first IF stage 53 as described above. The AGC amplifier preferably is maintained at a predetermined back bias such as 2 volts so that the first IF amplifier is maintained at its maximum gain setting unless the signal level at the AGC detector exceeds the threshold, whereupon AGC action occurs.

In addition to the signal and AGC outputs of the second IF amplifier, a third use is to drive an AFC discriminator 64. This discriminator, of the conventional Foster Seeley configuration, produces a unidirectional voltage proportional to the deivation of its input signal from a predetermined center frequency. This error signal is applied via lead C to control the frequency of a voltage controlled oscillator 65, which actually is the first local oscillator appearing in FIG. 5.

The above-described receiver circuitry is a relatively conventional double conversion superheterodyne receiver will AGC and AFC and particularly desirable for this application where the typical remote transmitter operates in the CW mode in the 200–300 megacycle range. Of course, with other types of modulation or other operating frequencies, the circuitry would be modified according to established electronic design procedures.

The transmitter of this invention appearing in FIG. 7 is fed over lead F by the transmitter modulator 63, which combines the amplified detected signal from the receiver of FIGS. 5 and 6 with the pulse arriving on lead E from the magnetometer or azimuth reference described below.

The azimuth reference of FIG. 8 is designed to supply a positive pulse each time the null of the receiving antenna pattern faces north. It employs a coil 70, of for example, 1000 turns of #30 insulated wire and approximately 5 inches across mounted vertically within the nose cone 11. The coil generates a sinusoidal signal with frequency and amplitude proportional to the rate of rotation of the vehicle on descent. The output of the coil 70, is amplified in a low frequency amplifier 71, such as a Philbrick-type P61 DC amplifier and applied to a conventional Schmitt trigger circuit (transistors 72 and 73) which in conjunction with an emitter follower 74, acting as a DC bootstrap circuit, provides a trigger circuit virtually immune to changes in triggering level from amplifier drift or asymmetry of applied wave form. The net result is that a sine wave of ½ c.p.s. will produce trigger operation at essentially the same point in each cycle whether the peak-to-peak voltage is one or ten volts.

The desired change of state occurs when the input signal crosses zero volts in an increasing positive voltage direction. This occurs when the coil lies in the east-west plane (with vehicle rotation clockwise when viewed from above). The output of the Schmitt trigger circuit drives a monostable multivibrator 75; the output of which is a 200 microsecond pulse of about supply voltage amplitude. The 200 microsecond pulse width is of adequate width to provide visibility on a display screen in the receiving station and narrow enough to give position definition. The monostable multivibrator 75 also serves to block random pulses from the Schmitt trigger which might be caused by noise or unwanted signals.

The 200 microsecond pulse on lead E is added to the received information signal in the summing point 76, at the input to the transmitter modulator 63, and the modulation signal applied over lead F to the transmitter of FIG. 7. The transmitter includes basically a voltage-controlled oscillator 80, having its output mixed with the output of a stable crystal oscillator 82 in a mixer driver stage 82. The modulated VCO 80 operates at a frequency of approximately 10 mc. and is temperature compensated by thermistor 83, providing frequency stability in the order of 0.0005 percent/degree C. Frequency modulation is accomplished by application of the modulation signal to a pair of back-to-back, high Q "Varicap" varactors 84 and 85, providing modulation linearity and freedom from carrier peak loading effects.

The difference frequency, approximately 32 mc. obtained in the driver mixer 81, is introduced into a first frequency doubler and buffer amplifier 86. This frequency doubler (32.06 to 64.125 mc.) of conventional "push-push" design drives a second similar doubler 90 (64.125 to 128.25 mc.) which in turn drives a final output stage doubler 91 (129.25 to 258.5 mc.). The final doubler 91 uses the non-linear characteristics of a "Varicap" varactor as a passive doubler. This stage 91, in turn is connected to the transmitting antenna, shown in illustrative form as the rotor blades of the vehicle.

Similar to the receiver circuit designs shown, the particular circuits shown for the azimuth reference and transmitter illustrate useful embodiments but are not to be construed as the only circuitry which might be used to accomplish the results of this invention.

Other aspects of the invention of particular significance are the relationships between the two receiving antennae and also between the receiving antenna array, the azimuth references, and the transmitting antenna.

The two receiving antennae are positioned in spaced relationship suspended beneath the vehicle body and fed through a common lead. In order to achieve the required non-uniform (i.e. cardioid) field in the horizontal plane, the two antennae are fed with antenna currents of equal magnitude but out of phase. This is in accordance with antenna theory wherein a two element array of vertical antennas separated by a distance S and fed with currents of equal amplitude but out of phase by an angle $\Psi$ will satisfy this requirement. Terman in Radio Engineers Handbook, McGraw-Hill, New York, N.Y., 1943, p. 803, has shown that the field distribution of such an array consisting of identical elements A and B is $$E = [[1+k\cos(\gamma+\Psi)]^2 + k^2\sin^2(\gamma+\Psi)]^{1/2} E_\delta \quad (1)$$

where $k$ = ratio of current in antenna 24B to current in 24A
$\gamma = (2\pi S/\lambda)\cos\theta\cos\delta$
$\Psi$ = phase angle by which current in 24B lags current in 24A
$S/\lambda$ = spacing of radiators in wave lengths
$\theta$ = angle in horizontal plane (azimuthal angle), measured with respect to a line joining the antennas
$\delta$ = vertical angle measured with respect to the horizontal
$E_\delta$ = field radiated by antena 24A, with antenna 24B removed but no change of current in antenna 24A.

In the Searcher application, the antennas are fed with currents of equal amplitude so that $k=1$. Also, in the horizontal plane $\delta=0°$, so that $\cos\delta=1.00$. Equation 1 therefore reduces to $$E = [[1+\cos(\gamma+\Psi)]^2 + \sin^2(\gamma+\Psi)]^{1/2} E_\delta \quad (2a)$$

or $$E = \sqrt{2E_\delta} 1+\cos(\gamma+\Psi)^{1/2} \quad (2b)$$

or $$E = 2E_\delta \cos\left(\frac{\gamma+\Psi}{2}\right) \quad (2c)$$

Since the angle $\gamma$ is a function of the azimuthal angle $\theta$, the radiation pattern in the horizontal plane can be made to have a null along the line joining the two antennas by setting $\gamma+\Psi=180°$. The sharpness and the depth of the null change as the frequency deviates from the design center frequency. This is due to the fact that both $\gamma+\Psi$ are frequency dependent. This dependance is shown in the definitive equations for these parameters as shown below.

$$\gamma = \frac{2\pi}{\lambda} S\cos\theta \quad (3a)$$

$$\Psi = \frac{2\pi}{\lambda} L \quad (3b)$$

where S is the physical separation between elements and L is the length of the electrical phasing section that controls the phase of the current to antenna 24B.

When the frequency of operation is changed, both $\gamma$ and $\Psi$ change by the same proportion in the same direction. Both increase with an increase in frequency, and decrease with a decrease in frequency. This variation in these angles with frequency changes accounts for the change in the null as the frequency is altered. If, however, one of these angles can be made to increase by the same amount that the other decreases when the frequency is varied, the null would then be independent of frequency and its sharpness and depth would remain constant.

Figure 5:
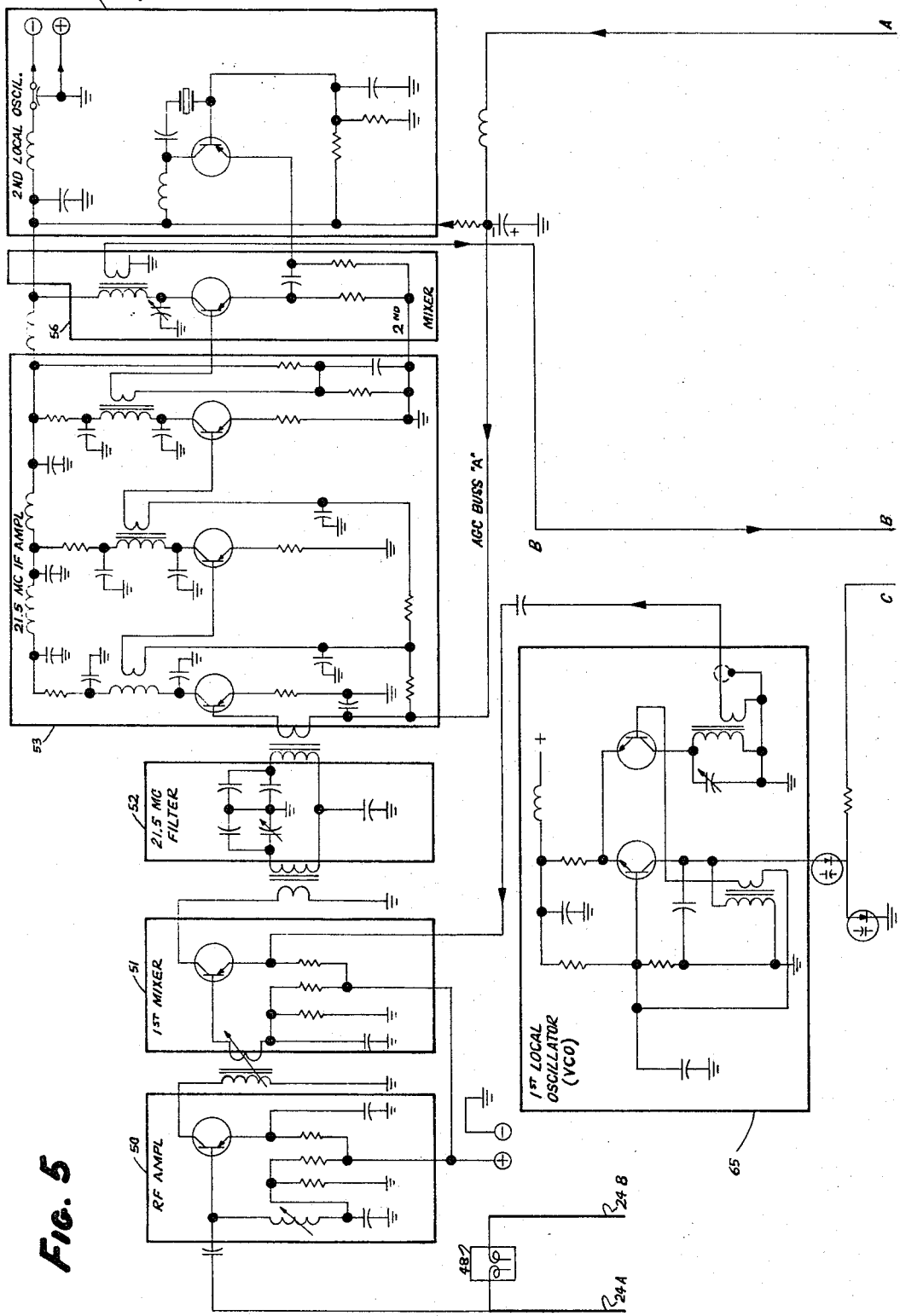
Figure 6:
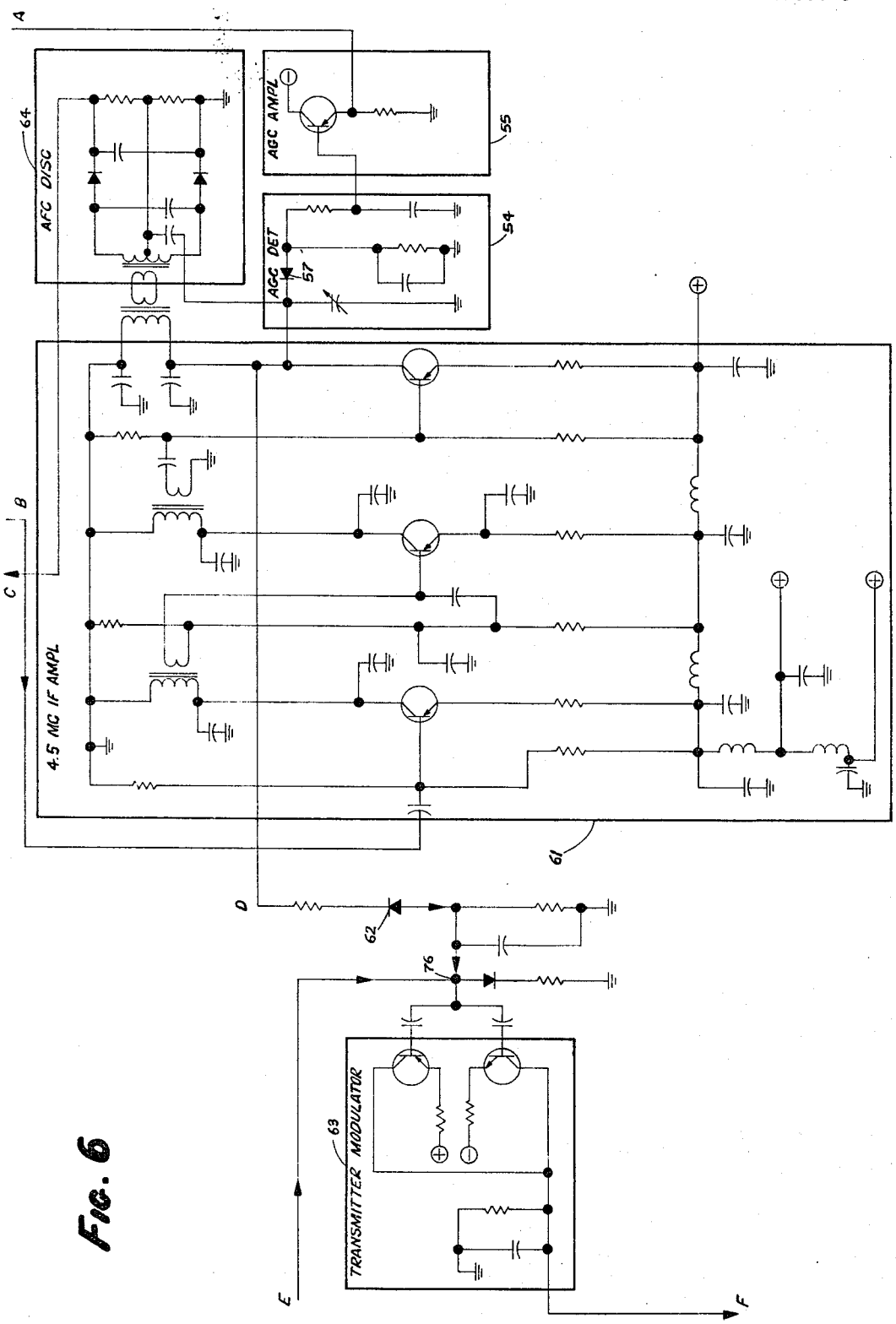

The null has been made independent of frequency and can be accomplished by the insertion of a transformer 48, shown in FIG. 5 with a unity turns ratio into the transmission line feeding antenna 24B in order to achieve a 180° phase reversal, and setting $S=L$; that is, the length of the phasing section equal to the separation between the antennas. That the null is independent of frequency changes when this is done can be seen by modifying Equation 2c as follows:

$$E = 2E_\delta \cos\left(\frac{\gamma+\Psi+180°}{2}\right) \quad (4a)$$

$$= 2E_\delta \sin\left(\frac{\gamma+\Psi}{2}\right) \quad (4b)$$

$$= 2E_\delta \sin\frac{2\pi}{\lambda}\left(\frac{S\cos\theta+L}{2}\right) \quad (4c)$$

From Equation 4c it follows, therefore, that whenever $\theta = 180°$, the field intensity will equal zero no matter what the frequency.

There is some effect on the gain of the array caused by addition of the transformer to the system and by setting S equal to L. However, any reduction in gain is relatively small. Furthermore, since the system is being used as a direction finding device, primary interest is in the sharpness and depth of the null rather than in the over-all gain of the array.

In planes other than the horizontal plane, that is wherever $\delta$ is not equal to zero degrees, Equation 4c must be modified to include this vertical angle dependence. Therefore, the more general form of the field of the array described is:

$$E = 2E_\delta \sin\left[\frac{2\pi}{\lambda}\left(\frac{S\cos\theta\cos\delta + L}{2}\right)\right] \quad (5)$$

This equation illustrates the fact that the position of the null is independent of frequency for any value of $\delta$, although the depth of the null will decrease as $\delta$ increases.

The second significant aspect related to the antenna system is that the azimuth reference loop 34 is mounted in the nose cone oriented 90° with respect to the null of the receiving antennae so that the receiving antenna array is facing magnetic north when the azimuth reference pulse is generated. As a result, the direction of the receiving antenna is indicated once per revolution throughout descent.

Also the transmitting antenna 25, is mounted in the null zone of the receiving array and extends parallel to the plane of maximum field of the receiving antenna array. This minimizes coupling between the two antenna systems and improves the effectiveness of the operation of the Searcher system. Also the rotor blades may be used as the transmitting antenna to achieve an effective omnidirectional transmitting system.

In summary, the radio repeater and direction-finding system of this invention constitutes a small portable system which can increase the effective antenna height of the searching vessel to many thousands of feet for increased high frequency radio range. Moreover, the system will operate for close to an hour on descent relaying signal information and the bearing of a remote beacon. The search vessel or vehicle is not restrained in any way after launch of the Searcher vehicle, and it may immediately proceed toward the beacon while maintaining continuous communication with the beacon via the descending relay station. Bearing data from the Searcher repeater is not affected by the position or movement of its launch vessel or vehicle.

The physical features of the system are compatible with, and actually enhance the electronics operation of the system. Particularly where the rotor blades are used as antennae, the transmitting and receiving antennae are positioned to minimize aerodynamic drag for the boost phase of operation and deployed in the search phase for minimum coupling and desired radiation patterns.

The vehicle not only acts as a communications link and direction finder, but also provides beacon range as well. The launch vessel merely monitors the relayed signal until it drops out as the Searcher relay drops below the radio horizon of the remote beacon. The time interval between loss of relayed signal and loss of azimuth pulse and carrier, directly indicates range from Searcher to the beacon.

These variations and others may be made without departing from the spirit and scope of this invention. The monopoly granted under the patent laws of the United States is therefore determined not by the specific embodiments illustrated, but rather by the scope of the following claims and their equivalents.

What we claim is:
1. A radio repeating system adapted to provide range and bearing information of remote radio transmitter radiating a radio signal, the system comprising
   a local radio receiver, and
   a radio repeater, including a receiver for receiving radio signals from a remote radio transmitter and a transmitter for retransmitting the received radio signals to be detected by the local radio receiver,
   said radio receiver, including an azimuth directional antenna, mounted in a rocket-propelled aerodynamic body launched in a substantially vertical direction from the location of the local radio receiver,
   said aerodynamic body, including rotor means for producing rotating controlled rate vertical descent of the aerodynamic body after launch and end of rocket propelled flight,
   an azimuth reference fixed with respect to the aerodynamic body producing a signal indicative of the azimuth of the aerodynamic body as it rotates on descent,
   radio transmitter means in the repeater for transmitting both the azimuth reference signal and received radio signals as modified in level as a function of the rotation of the aerodynamic body and the directional characteristics of the receiver antenna,
   said local radio receiver including means for displaying the variation in level of the received signal with respect to the azimuth reference signal to indicate bearing of the remote transmitter from the radio repeater,
   and said local radio receiver also including timing means for measuring the time period between the loss of retransmitted remote signal as it passes below the radio horizon of the radio repeater and the loss of all signal from the radio repeater as it reaches the earth, said time period being a function of the known rate of aerodynamic body descent and the range to the remote transmitter.

2. The combination in accordance with claim 1 wherein said local radio receiver includes means responsive to the loss of repeated signal for triggering a timing circuit and responsive to loss of all signal for stopping the timing circuit and means for displaying the time interval therebetween as range from the remote beacon to the radio repeater.

3. A method of detecting the range and bearing of a remote radio beacon comprising the steps of
   launching in a substantially vertical direction an autogyrating descent vehicle carrying a radio repeater having directional receiving characteristics in azimuth, and producing a local azimuth reference signal,
   monitoring the radio repeater composite signal detecting the time relationship between the azimuth reference signal from the radio repeater and the repeated signal as modified by the directional characteristics of the repeater to determine the bearing of the remote radio beacon and
   detecting the time relationship between the loss of the repeated signal as the beacon passes under the radio horizon and the loss of all signal as a function of the known rate of descent of the vehicle and the range of the remote beacon.

4. The combination in accordance with claim 3 wherein the directional receiving characteristics of the repeater produces a null in the received signal including the step of measuring phase relationship between the azimuth reference signal and the null of the repeated signal as an indication of a beacon bearing.

5. The combination in accordance with claim 3, including measuring the time interval between loss of repeated signal and loss of all signal from the repeater as a function of range from the beacon to the repeater and the rate of descent of the repeater.

References Cited

UNITED STATES PATENTS

| | | | |
|---|---|---|---|
| 2,233,275 | 2/1941 | Wolff | 343—118 |
| 2,361,956 | 11/1944 | Moseley | 343—117 X |
| 2,447,728 | 8/1948 | Bartholy. | |
| 2,953,782 | 9/1960 | Byatt | 343—118 |
| 2,959,376 | 11/1960 | Saurma | 244—1 |
| 3,160,879 | 12/1964 | Downing et al. | 343—112 X |
| 3,181,824 | 5/1965 | Anania. | |

RODNEY D. BENNETT, *Primary Examiner.*

M. F. HUBER, *Assistant Examiner.*